(12) United States Patent
Kaplan

(10) Patent No.: US 7,672,922 B2
(45) Date of Patent: Mar. 2, 2010

(54) POINTER-ORIENTED OBJECT ACQUISITION METHOD FOR ABSTRACT TREATMENT OF INFORMATION OF AI OF AI OF A CYBORG OR AN ANDROID BASED ON A NATURAL LANGUAGE

(76) Inventor: Boris Kaplan, Guardinistr. 160, Munich (DE) 81375

( * ) Notice: Subject to any disclaimer, the term of this patent is extended or adjusted under 35 U.S.C. 154(b) by 112 days.

(21) Appl. No.: 11/727,322

(22) Filed: Mar. 26, 2007

(65) Prior Publication Data
US 2008/0109213 A1 May 8, 2008

(51) Int. Cl.
G06N 5/00 (2006.01)
G06F 17/00 (2006.01)
(52) U.S. Cl. .......................... 706/45; 700/247; 717/108
(58) Field of Classification Search ............... 706/16, 706/45; 717/104, 108, 136
See application file for complete search history.

(56) References Cited

U.S. PATENT DOCUMENTS 5,509,810 A * 4/1996 Schertz et al. ............... 434/262

2005/0251291 A1* 11/2005 Solomon ..................... 700/245
2007/0256026 A1* 11/2007 Klassen et al. .............. 715/764

* cited by examiner

*Primary Examiner*—David R Vincent
*Assistant Examiner*—Kalpana Bharadwaj

(57) ABSTRACT

The pointer-oriented object acquisition method for abstract treatment of information of the computer system of AI of a cyborg or an android based on a natural language.

The pointer-oriented object acquisition method for abstract treatment of information of the computer system of AI of a cyborg or an android based on a natural language, in which three pointers are created in the computer main memory (in RAM) of the computer system of AI of a cyborg or an android in the natural language, in which the computer system is working at this timeframe, at runtime. In this way, the subjective object, the associative object and the abstract object of the computer system of AI of a cyborg or an android are instantiated and are initialized. With these objects, which are implemented in a natural language, one can access to, i.e. manipulate with the element variables, i.e. with the data elements, of a class of the classification tree of the computer system of AI of the cyborg or the android.

15 Claims, 10 Drawing Sheets

Fig. 1A

Object (associative)

| |
|---|
| $S_1$ = V:\Cyborg\SenseOrgans\SenseOfSight\See1918.see |
| $S_2$ = W:\Cyborg\SenseOrgans\SenseOfHearing\Hearing1918.hear |
| $S_3$ = X:\Cyborg\SenseOrgans\SenseOfSmell\Smell1918.smell |
| $S_4$ = Y:\Cyborg\SenseOrgans\SenseOfTaste\Taste1918.taste |
| $S_5$ = Z:\Cyborg\SenseOrgans\SenseOfTouch\Touch1918.touch |
| ... |
| $S_n$ = N:\Cyborg\SenseOrgans\n-Sense\n-Sense1918.n-sense |
| test4 shall love test4's neighbor as test4 herself |
| sunday, morning |

Object (subjective)

| |
|---|
| $S_1$ = V:\Cyborg\SenseOrgans\SenseOfSight\See1918.see |
| $S_2$ = W:\Cyborg\SenseOrgans\SenseOfHearing\Hearing1918.hear |
| $S_3$ = X:\Cyborg\SenseOrgans\SenseOfSmell\Smell1918.smell |
| $S_4$ = Y:\Cyborg\SenseOrgans\SenseOfTaste\Taste1918.taste |
| $S_5$ = Z:\Cyborg\SenseOrgans\SenseOfTouch\Touch1918.touch |
| ... |
| $S_n$ = N:\Cyborg\SenseOrgans\n-Sense\n-Sense1918.n-sense |

V:\Cyborg\SenseOrgans\SenseOfSight\See1918.see

W:\Cyborg\SenseOrgans\SenseOfHearing\Hearing1918.hear

X:\Cyborg\SenseOrgans\SenseOfSmell\Smell1918.smell

Y:\Cyborg\SenseOrgans\SenseOfTaste\Taste1918.taste

Z:\Cyborg\SenseOrgans\SenseOfTouch\Touch1918.touch

...

N:\Cyborg\SenseOrgans\n-Sense\n-Sense1918.n-sense

Object (abstract)

| love:Love |
|---|
| who = Test4 |
| shall = shall |
| do = love |
| whose = Test4's |
| whom = neighbor |
| as = as |
| whom = Test4 |
| which = herself |
| real timestamp = Sunday, morning |

Reference

| lieben:Lieben |
|---|
| wer = Test4 |
| soll = soll |
| wessen = Test4s |
| welchen = Nächsten |
| tun = lieben |
| wie = wie |
| wen = Test4 |
| wessen = selbst |
| echter Zeitstempel = Sonntag, Vormittag, später |

Second Pointer,
physically
(Object (associative))
(Association)

Fig. 2A

Objects (abstract)
Existing Information

Object (abstract),
Conclusion

| derived:Derive |
|---|
| which = the |
| what = class |
| which = what kind of = "Whom"
is = is |
| done = derived |
| from = from |
| which = the |
| what = class |
| which = what kind of = "Interrogative"
real timestamp = Sunday, morning |

| love:Love |
|---|
| who = Test4 |
| shall = shall |
| do = love |
| whose = Test4's |
| whom = neighbor |
| as = as |
| whom = Test4 |
| which = herself |
| real timestamp = Sunday, morning, still later |

| is:Be |
|---|
| which = the |
| what = class |
| which = what kind of = "Whom"
does = is |
| how many = an |
| what = interrogative |
| to = to |
| how many = an |
| what = object |
| real timestamp = Sunday, morning, later |

| represented:Represent |
|---|
| what = Object |
| was = was |
| done = represented |
| as = as |
| how many = a |
| what = noun |
| real timestamp = Sunday, morning, later |

| indicates:Indicate |
|---|
| what = Noun |
| does = indicates |
| how many = a |
| what = person |
| real timestamp = Sunday, morning, later |

| is:Be |
|---|
| what = Noun |
| does = is |
| how many = an |
| which = animated |
| what = noun |
| real timestamp = Sunday, morning, later |

Fig. 2B or

**Objects (abstract),
Existing Information**

| derived:Derive |
|---|
| which = the |
| what = class |
| which = what kind of = "Who" <br> is = is |
| done = derived |
| from = from |
| which = the |
| what = class |
| which = what kind of = "Interrogative" <br> real timestamp = Sunday, morning, still still later |

**Object (abstract),
Conclusion**

| steal:Steal |
|---|
| who = test4 |
| shall = shall |
| not = not |
| do = steal |
| real timestamp = Sunday, morning, still still still still later |

| is:Be |
|---|
| which = the |
| what = class |
| which = what kind of = "Who" <br> does = is |
| how many = an |
| what = interrogative |
| to = to |
| how many = a |
| what = subject |
| real timestamp = Sunday, morning, still still still later |

| represented:Represent |
|---|
| what = Subject |
| was = was |
| done = represented |
| as = as |
| how many = a |
| what = noun |
| real timestamp = Sunday, morning, still still still later |

| indicates:Indicate |
|---|
| what = Noun |
| does = indicates |
| how many = a |
| what = person |
| real timestamp = Sunday, morning, still still still later |

| is:Be |
|---|
| what = Noun |
| does = is |
| how many = an |
| which = animated |
| what = noun |
| real timestamp = Sunday, morning, still still still later |

Fig. 2C or

**Object (abstract),
Existing Information**

| derived:Derive |
|---|
| which = the |
| what = class |
| which = what kind of = "Shall"<br>is = is |
| done = derived |
| from = from |
| which = the |
| what = class |
| which = "Modal" |
| what = "Verb" |
| which = what kind of =<br>which + what = ("Modal Verb")<br>real timestamp = Sunday, morning, still still still still still later |

**Object (abstract),
Conclusion**

| steal:Steal |
|---|
| who = test4 |
| shall = shall |
| not = not |
| do = steal |
| real timestamp =<br>Sunday, morning, still still still still still still later |

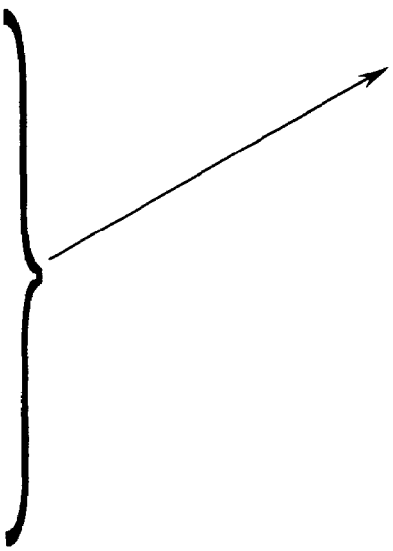

Fig. 3A

Objects (abstract),
Existing Information

| derived:Derive |
|---|
| which = the |
| what = class |
| which = what kind of = "Who"<br>does = is |
| done = derived |
| from = from |
| which = the |
| what = class |
| which = what kind of = "Interrogative"<br>real timestamp = Sunday, morning |

Object (abstract),
1. Conclusion

| love:Love |
|---|
| who = Test4 |
| shall = shall |
| do = love |
| whose = Test4's |
| whom = neighbor |
| as = as |
| whom = Test4 |
| which = herself |
| real timestamp = Sunday, morning, still later |

Object (abstract),
2. Conclusion

| love:Love |
|---|
| who = Test4 |
| shall = shall |
| do = love |
| whose = Test4's |
| whom = neighbor |
| whom = whose + whom = (Test4's neighbor)<br>as = as |
| whom = Test4 |
| which = herself |
| real timestamp = Sunday, morning, still later |

Fig. 3B

Objects (abstract),
Existing Information

| derived:Derive |
|---|
| which = the |
| what = class |
| which = what kind of = "Where"<br>does = is |
| done = derived |
| from = from |
| which = the |
| what = class |
| which = what kind of = "Interrogative"<br>real timestamp = Sunday, morning |

Object (abstract),
1. Conclusion

| was:Be |
|---|
| who = Test4 |
| did = was |
| on = on |
| which = the |
| what = Marienplatz |
| at = at |
| how many = ten |
| what = o'clock |
| real timestamp = Sunday, morning, still later |

Objects (abstract),
Existing Information

| derived:Derive |
|---|
| which = the |
| what = class |
| which = what kind of = "When"<br>does = is |
| done = derived |
| from = from |
| which = the |
| what = class |
| which = what kind of = "Interrogative"<br>real timestamp = Sunday, morning |

Object (abstract),
2. Conclusion

| was:Be |
|---|
| who = Test4 |
| did = was |
| on = on |
| which = the |
| what = Marienplatz |
| where = on + which + what = (on the Marienplatz)<br>at = at |
| how many = ten |
| what = o'clock |
| when = at + how many + what = (at ten o'clock)<br>real timestamp = Sunday, morning, still later |

POINTER-ORIENTED OBJECT ACQUISITION METHOD FOR ABSTRACT TREATMENT OF INFORMATION OF AI OF AI OF A CYBORG OR AN ANDROID BASED ON A NATURAL LANGUAGE

Pointer-oriented object acquisition method for abstract treatment of information of the computer system of Artificial Intelligence of a cyborg or an android which is based on a natural language and with which the substances of a human received signal-reaction, a human association, a human thought are physically built.

The present invention refers to the pointer-oriented object acquisition method for abstract treatment of information of the computer system of Artificial Intelligence of a cyborg or an android. The pointer-oriented object acquisition method is based on a natural language. With the pointer-oriented object acquisition method the substances of a human received signal-reaction, a human association, a human thought are physically built.

By the European patent (KR 2003000254, DE 10361726), a robot toy with artificial intelligence and control method for it is patented. Several patent claims specific for a robot are disclosed by the patent. The AI of the robot toy is planned for its mechanical control.

From the American patent (U.S. Pat. No. 5,963,663 A), a land mark recognition method for mobile robot navigation is known. Signs (the land marks) are identified as objects in that invention. In the invention, with help of an object recognition apparatus, which work after the principle of the pattern recognition of the neuronal net, a pattern of a signal is differentiated from another pattern. The input signal is decomposed on the red value, the green value, and the blue value for the pattern recognition. The invention makes it possible, that a robot can execute the different technical tasks, e.g. to transport objects in plants. The point from that invention is not a computer system of AI of a cyborg or an android.

The Publication "View-invariant modeling and recognition of human actions using grammars", A. S. Ogale, A. Karapurkar, Y. Aloimonos, International Conference on Computer Vision (ICCV), Workshop on Dynamical Vision, October 2005, is relevant to the state of the related art. The article is about:

1. an approach for using multiview training videos to automatically create view-independent representations of actions within the framework of probabilistic context-free grammar;

2. that each body-pose is represented implicitly by a family of silhouettes observed in different viewpoints;

3. that the movements of the human body are identified with lower level verbs having direct visual counterparts;

4. that in the framework, each visual verb is described by a short sequence of key body-pose pairs;

5. that it is clear that a particular key body-pose (such as "standing upright") may be common to many body actions;

6. that the body "actions have been given names (like Kneel) for presentation purposes".

The article "Use of natural language for knowledge acquisition: Strategies to cope with semantic and pragmatic variation", Thomas Wetter, Ralf Nüse, IBM J. Res. Develop., Vol. 36, No. 3, May 1992, pp. 435-468, is known. The article is about:

1. the sophisticated natural-language analyzers (NLAs);

2. the expert systems and knowledge acquisition via natural language, or rather "someone (e.g., an expert) knows some relevant facts about a particular domain and tries to describe those facts by using a natural language; someone else (e.g., a system) "understands" those utterances (or written symbols) and, as a consequence, also "knows" the facts described";

3. that "four entities involved in the process: knower 1, who has knowledge coded in some mental language; the source language, which conveys this knowledge to some receiver; knower 2, who is the recipient of the source-language expression (and may be, say, a software product); and finally a domain to which the aforementioned representations refer in one way or another";

4. that "the typical examples of open worlds (the open domains) would arise in medical diagnosis, job applicant assessment, etc"; that "the typical examples of closed worlds (the closed domains) are games such as chess";

5. that "the meaning of "meaning" is completely different in static and dynamic languages; a static language can only cover one aspect of the real world"; that "the target representation must be a formal (static), machine-processable language"; that "in dynamic languages the meaning of an expression is extensionally characterized by its occurrences in all contexts; every new use of an expression adds an occurrence and hence changes its meaning"; that "talking about medical diagnosis, job applicant assessment, etc. in natural language as the prototypical form of a dynamic language is a recommended combination";

6. that "the expert knowledge must be transformed into natural language, and the linguistic expressions resulting from this process must be transformed into "knowledge" again";

7. the rules, e.g. the rule: "If that and that is the case, then that and that is the case", (or rather the rule-based systems, the automated rule-acquisition systems);

8. that "if, however, a system requires prior knowledge in order to understand a rule formulated in natural language, all knowledge cannot be communicated via natural language";

9. that "it is very difficult to convey common-sense knowledge via natural language, in addition, human beings do not acquire it in this manner, either"; that the "common-sense knowledge in an NLA+ must be either "programmed" or acquired using media other than natural language";

10. that the "generic sentences can be misunderstood", that "a sentence such as "The jay has a special beak" has the same surface structure as "The jay has a broken wing"; the first sentence, however, is a generic one, which would have to be analyzed as a universally quantified conditional (and thus constitutes "knowledge" about jays)" (in general), "while the second sentence describes an event" (to a specific jay); that "a solution of those problems is still not in sight".

The system, method and apparatus for organizing groups of self-configurable mobile robotic agents in a multi-robotic system are known from the American patent (U.S. Pat. No. 7,343,222). That invention is about:

1. that, "Specifically, the present invention represents a multirobotic system (MRS) that includes at least two mobile robotic agents (MRAs). The MRAs use complex software program code, including mobile software agents, to execute specific instructions involving robotic and computation operations."

2. that the "Multi-robotic systems" (MRS) "are complex networks that facilitate the interaction between autonomous robotic agents according to specific rules of behavior in order to perform a specific function or combination of functions."

3. that the "Artificial intelligence (AI) is used in a number of MRS processes, including individual robot learning and decision making using genetic algorithms (GAs), genetic programming (GP) and other evolutionary computation (EC) approaches as well as group robotic agents that uses A-NN and hybrid evolutionary A-NN approaches (including GA, GP, FL, etc.) that provide tools for adaptive collective learning and decision making."

4. that "As the MRS system is linked together in a distributed network of autonomous robotic agents that employ powerful computation resources and AI processes, the system can automatically "think" like a group and constantly reconfigure to the best available situation while interacting with and adapting to its environment."

5. that the "Intelligent mobile software agents (IMSAs) operate within the multi-agent system (MAS) . . . "

6. that the ". . . intelligent negotiation agents (INAs) represent a core and innovative aspect of the present system as a vehicle for MRAs to interact and solve problems."

7. that the "Cellular automata (CA) models provide an important tool to simulate the changing movements of MRAs in an MRS. By using AI approaches, each robot is represented as a cell in a larger system. Cells can interact with neighbor cells in the neighborhood of a CA system, with two dimensional, three dimensional or four dimensional models representing the change in cellular states."

8. that "There are numerous applications of the present system", for example:

8.1. in "Weather Prediction

The present system is useful to organize groups of weather balloons or aircraft to gather and disseminate data. The MRS is ideally suited to complex adaptive environments such as detecting dangerous weather conditions such as tornados or hurricanes. Groups of self-organizing MRAs can more rapidly predict dramatic weather system changes.

In an active mode, MRAs can not only predict poor weather but can influence its outcome. In a drought situation, MRAs can seed clouds to increase the likelihood of inducing rain. In an extreme case, MRAs can prevent tornadoes by influencing their movement very early in their development and changing the immediate environmental conditions. Only self-organizing groups of automated mobile robotic agents with specific functions—such as warming cool air in limited areas so as to retard or minimize a turbulent cyclic force—could execute this precisely or rapidly."

8.2. in "Medical Applications: Medi-Bots

There are two categories of application of the present invention to the medical field. First, groups of medical robots (medi-bots) can be used in critical field situations to stabilize a patient.

Autonomous medi-bots work together to (a) diagnose a patient's trauma, (b) resuscitate, via electronic pulse or CPR, a patient whose cardiac or pulmonary functions have ceased, (c) cauterize wounds to stop (or minimize) bleeding, (d) apply an IV for intravenous solution transmission in order to replace vital fluids and (e) call for more medical resources by providing a precise physical location position. Multiple medi-bots can much more efficiently rescue and stabilize patients, thereby saving lives.

Second, groups of medi-bot can assist doctors in clinical situations by performing functions typically attributed to nurses and assistants. Such medi-bots can monitor patient functions during procedures as well as actively support the surgeon or dentist so as to save time. These medi-bots can also supply expertise in critical operating room environments. In critical emergency room situations, where time and precision can make a difference, medi-bots can save lives."

8.3. in "Expert Systems

Groups of anthropological MRA "androids" can work together to form complex expert systems." Thomas Wetter, Ralf Nüse teach such expert systems in the article "Use of natural language for knowledge acquisition: Strategies to cope with semantic and pragmatic variation" as explored above.

From the American patent application (US 20070106127 A), the user interface methods and apparatus for controlling the visual display of maps having selectable map elements in mobile communication devices are known. The application "relates generally to user interface techniques for the control of visually displayed maps having selectable map elements (e.g. points of interest indicators and/or off-map indicators) in mobile communication devices operating in wireless communication networks." "Off-map indicators corresponding to map elements that are "off the map" (i.e. not viewable but within a predetermined range of location) may be provided in the display . . . and made selectable as well. " ". . . off-map indicator has an arrow pointer which is oriented in the direction of the map element that is off the map." The theme of that invention is not a computer system of AI of a cyborg or an android. The principal topic of that invention are not the substances of a human received signal-reaction, a human association, a human thought.

From the American patent (U.S. Pat. No. 5,509,810), an interactive neonatal resuscitation training simulator and method, respectively an infant android of life-like appearance and response, is known. The simulator and method provide a trainee with a life-like simulation of a resuscitation process on a newborn infant, and in particular, a life-like simulation of what an attending physician would experience while resuscitating a newborn infant at a resuscitation station within a hospital's delivery room. The adjustment in the android simulated condition mimics a predetermined human reaction to resuscitation activity such as that performed on the android by the trainee. In enhanced embodiments, the android is equipped with life-like human appearance and life-like human responses. Further, a resuscitation workstation having the appearance of a conventional resuscitation workstation is employed to present a more real-life simulation to the trainee. The principal topic of the invention is not a computer system of AI of a cyborg or an android. The patent employing the baby like infant-android during the first month after birth is not about a pointer-oriented object acquisition method for abstract treatment of information of the computer system of AI of a cyborg or an android with which the substances of a human received signal-reaction, a human association, a human thought are physically built.

With only know-how of the American patent (U.S. Pat. No. 7,343,222), of the American patent application (US 20070106127 A) and of the American patent (U.S. Pat. No. 5,509,810) and also of the article "Use of natural language for knowledge acquisition: Strategies to cope with semantic and pragmatic variation" nobody can physically substantiate the human received signal-reaction, the corresponding human association and the corresponding human thought.

From my patent application (DE 10 2005 050 579.1, US 11/355,287, IS 174910), a computer system in which a human received signal-reaction, a human association, a human thought are substantiated and the working method of this computer system of artificial intelligence of a cyborg or an android are known. The patent application is about a computer system as the computer system of AI of a cyborg or an android based on a natural language. The computer system includes the hardware devices, the sensors groups, the interfaces, the senses input receiver, the senses output transmitter, the database, the cyborg-interpreter. In the computer system, a human signal-reaction, a human association, a human thought are substantiated. The natural language which the computer system uses with its working method is interpreted by the computer system in an object-oriented way. The human received signal-reaction, the corresponding human association and the corresponding human thought which are substantiated in the system are the corresponding objects of the same class. The computer system functionality is based on the objects, which are unique. The human association and the human thought are defined relatively to time but not uniquely. The objects generated by the natural language can represent some more reactions in each case from some more sensors groups than five reactions of five sense organs. In the application, some different approaches of the working method in a natural language are described as well. For the working method in another natural language, the computer system uses the references. The subjective objects of a computer system of AI of a cyborg or an android in that patent application represent the received human signal-reactions. The associative objects of a computer system of AI of a cyborg or an android in that patent application represent the human associations. The abstract objects of a computer system of AI of a cyborg or an android in that patent application represent the human thought-substances.

From my patent application (DE 10 2005 054 901.2, US 11/368,422, IS 175533), a working method for treatment of abstract objects (the thought-substances) of the computer system of AI (Artificial Intelligence) of a cyborg or an android is known. The patent application is about the working method for the treatment of an abstract object of the computer system of AI of a cyborg or an android, in which an abstract object (a thought-substance) is compared with the other abstract objects (the other thought-substances). The working method is impelled by the computer system by itself. The abstract objects (the thought-substances) and/or the classes of the objects are processed in a no permanent, in the sense of a no continuous treatment mode, it means discretely, for each abstract object (each thought-substance). The abstract objects and the classes of abstract objects are classified by the computer system by itself subjectively (in the sense of depending on the subject (on the computer system of AI of a cyborg or an android)) in a natural language only if the class of the objects is a verb in a natural language. The treatment mode is determined with the polymorphy of the classes classification of the computer system of AI of the cyborg or the android. The decision, whether an abstract object is to be treated and how the abstract object is to be handled within the bounds of the determined treatment mode, is determined with the classes classification of the computer system of AI of the cyborg or the android. With the working method more than ten internal directives of the abstract subjectivity of the computer system can be used.

Further, the humanoid robots are known which can move in human or animal way.

For example, ASIMO is a robot developed by company Honda which can move in human way.

The AIBO of company Sony, a robot-dog, which can be programmed. In addition, he can run, see, show his feelings and speak the predefined words.

The QRIO of company Sony. It is a humanoid robot itself, which can move in human way. He can do everything that the AIBO can do. He can also speak about something, or have a conversation. Besides, the speech recognition is used and the predefined response scenarios with many thousands of words are prepared. In addition, the QRIO is very expensive.

Further, the predicate logic is worldwide known. It plays a big role in informatics for the programming of expert's systems and AI. It is based on the logical predicate, which can take part as either a property or a relation between entities, but not as an action. The predicate is considered as not object-oriented. Neither the subject term nor the predicate term are considered relatively to time.

Some terms need to be defined for describing the present invention. The terms, and their definitions, include:

1. Android:

1.1. "Android der, -en/-en, Androide der, -n/-n ein zu bestimmten Tätigkeiten fähiger→Automat in Menschengestalt" (An android is → an automatic machine which is capable to the determined activities in the human shape) (The encyclopedia "Brockhaus-Enzyklopädie": in 24 vol. -19., fully revised Edition, F. A. Brockhaus GmbH, Mannheim 1986, ISBN 3-7653-1101-4/3-7653-1201-0; page 562).

1.2. "An android is an artificially created robot, an automation, that resembles a human being . . . in . . . behavior. The word derives from the Greek andr-, "meaning "man, male", and the suffix -eides, used to mean "of the species alike" (from eidos "species")."—Wikipedia, the free encyclopedia. htm (http://en.wikipedia.org/wiki/Android);

1.2.1. Unlike the terms robot (a "mechanical" being) and cyborg (a being that is partly organic and partly mechanical), the word android has been used in literature and other media to denote several different kinds of artificially constructed beings:

1.2.1.1. a robot that closely resembles a human;

1.2.1.2. a cyborg that closely resembles a human;

1.2.1.3. an artificially created, yet primarily organic, being that closely resembles a human.

2. Cyborg:

2.1. "Cyborg ['saibo:g; Kw. aus engl. cybernetic organism >kybernetisches Lebewesen<] der, -s/-s, in der Futurologie Bez. für einen Menschen, in dessen Körper techn. Geräte als Ersatz zur Unterstützung nicht ausreichend leistungsfähiger Organe (z.B. für lange Raumflüge) integriert sind" (Cyborg [from engl. cybernetic organism] in futurology a term for a human being in whose bodies some technical devices are integrated as substitution for support of the insufficiently efficient organs (for example for long space-flights)) (The encyclopedia "Brockhaus-Enzyklopädie": in 24 vol. -19., fully revised Edition, F. A. Brockhaus GmbH, Mannheim 1988, ISBN 3-7653-1105-7/3-7653-1205-3; page 67).

2.2. "The term cyborg, a portmanteau of cybernetic organism, is used to designate an organism which is a mixture of organic and mechanical (synthetic) parts . . . . Isaac Asimov's short story "The Bicentennial Man" explored cybernetic concepts . . . . His explorations lead to breakthroughs in human medicine via artificial organs and prosthetics." As well as to the ". . . artificial positronic brain . . . . Generally, the term "cyborg" is used to refer to a man or woman with bionic, or robotic, implants."—Wikipedia, the free encyclopedia. htm (http://en.wikipedia.org/wiki/Cyborg);

2.2.1. Generally, the aim is to add to or enhance the abilities of an organism by using technology, i.e. a man-machine mixture;

2.2.2. "Isaac Asimov's short story "The Bicentennial Man" explored cybernetic concepts . . . His explorations lead to breakthroughs in human medicine via artificial organs and prosthetics." As well as to the ". . . artificial positronic brain . . . ";

2.2.3. "The term "cyborg" is used to refer to a man or woman with bionic, or robotic, implants."

3. Strong Artificial Intelligence:

3.1. In the philosophy of artificial intelligence, strong AI is the claim that some forms of artificial intelligence can truly reason and solve problems; strong AI states that it is possible for machines to becomes sapient, or self-aware, but may or may not exhibit human-like thought processes.—Wikipedia, the free encyclopedia.htm (http://en.wikipedia.org/wiki/strong_AI);

3.2. "according to strong AI, the computer is not merely a tool in the study of the mind; rather, the appropriately programmed computer really is a mind" (J. Searle in Minds, Brains and Programs. The Behavioral and Brain Sciences, vol. 3, 1980)."—Wikipedia, the free encyclopedia.htm (http://en.wikipedia.org/wiki/strong_Al);

4. "The mind is the term most commonly used to describe the higher functions of the human brain . . . "—Wikipedia, the free encyclopedia.htm (http://en.wikipedia.org/wiki/Mind).

5. In psychology . . . two concepts or stimuli are associated when the experience of one leads to the effects of another, due to repeated pairing. This is sometimes called Pavlovian association for Ivan Pavlov's pioneering of classical conditioning.—Wikipedia, the free encyclopedia.htm (http://en.wikipedia.org/wiki/Association_%28psychology%29).

6. Thought:

6.1. "The thought is a direct sense shape of thinking. . . . the thought describes a result, a product of the thinking-process."—Wikipedia, the free encyclopedia.htm (http://de.wikipedia.org/wiki/Gedanke).

6.2. "It (thought) is an element/instance of thinking and is used as its synonym." "In philosophy, thought is also a synonym for idea."—Wikipedia, the free encyclopedia.htm (http://en.wikipedia.org/wiki/Thought_(disambiguation)).

7. "Telepathy (from the Greek τ☐λε, tele, "distant"; and παΘεIa, patheia, "feeling") is defined in parapsychology as the paranormal acquisition of information concerning the thoughts, feelings or activity of another person."—Wikipedia, the free encyclopedia.htm (http://en.wikipedia.org/wiki/Telepathy).

"The German Term for Telepathy is the Thoughts-Transfer."—Wikipedia, the free encyclopedia (http://de.wikipedia.org/wiki/Telepathie).

8. "The most popular and developed model of OOP is a class-based model, as opposed to an object-based model. In this model, objects are entities that combine state (i.e., data), behavior (i.e., procedures, or methods) and identity (unique existence among all other objects). The structure and behavior of an object are defined by a class, which is a definition, or blueprint, of all objects of a specific type . . . "—Wikipedia, the free encyclopedia.htm (http://en.wikipedia.org/wiki/Class-based_OOP).

9. Pointer:

9.1. "A pointer identifies in computer science a special class of variables, that refer to another memory space or the variables itself . . . The referred memory space contains either data (object, variable) or the program code."—Wikipedia, the free encyclopedia.htm (http://de.wikipedia.org/wiki/Zeiger).

9.2. In C and C++, pointers are variables that store addresses (of the computer memory) and can be NULL. A NULL-Pointer has a reserved value, often but not necessarily the value zero, indicating that it refers to no object. (The NULL-Pointer stores the address of a NULL-Object, i.e. points to nothing). A pointer is a simple implementation of the general reference data type (although it is quite different from the facility referred to as a reference in C++).—Wikipedia, the free encyclopedia.htm (http://en.wikipedia.org/wiki/Pointer).

10. Reference:

10.1. "A reference represents an identification of an object. . . . Therewith, a reference represents an alias name to an entity."—Wikipedia, the free encyclopedia.htm (http://de.wikipedia.org/wiki/Referenz_%28Programmierung%29).

10.2. A reference is an alias-name. When a reference has been created, it will be initialized with the name of another object, with the target. From this moment, the reference will be like an alternative name for the target, and everything that will be applied to the reference will, in fact, refer to the target. (The book "C++ in 21 Tagen", Jesse Liberty, 2000 by Markt&Technik Verlag (Publishing), ISBN 3-8272-5624-0, the authorized translation of the American original edition: "Teach Yourself C++ in 21 Days"© 1999 by SAMS Publishing, page 290).

11. Object:

11.1. Therewith . . . the new objects are created on the heap (the freely available memory storage area by dynamic memory allocation). The . . . given back address (of the memory storage area) will be stored in the pointer. (The book "C++ in 21 Tagen", Jesse Liberty, 2000 by Markt&Technik Verlag (Publishing), ISBN 3-8272-5624-0, the authorized translation of the American original edition: "Teach Yourself C++ in 21 Days"© 1999 by SAMS Publishing, pages 263, 264, 267, 285).

11.2. "Der Operator new erzeugt solche Objekte, und der Operator delete kann benutzt werden, um sie zu zerstören. Objekte, die durch new angelegt wurden, werden als >>im Freispeicher<< befindlich bezeichnet (und auch als >>Heap-Objekte<<oder >>im dynamischen Speicher angelegt<<)" (The operator "new" creates such objects, and the operator "delete" can be used to destroy them. The objects that were instantiated with "new" are defined as allocated >>in the freely available memory storage<< (as well as >>Heap-Objects<< or >>that are created by dynamic memory allocation<<)) (The book "Die C++-Programmiersprache"; 3. Edition; Bjarne Stroustrup (Der Erfinder von C++); Addison Wesley Longman Verlag (Publishing); 1998; ISBN 3-8273-1296-5; page 136; (the American original edition: "The C++-Programming Language", Bjarne Stroustrup (The inventor of C++), Third Edition, Addison-Wesley, Reading, ISBN 0-201-88954-4© 1997 AT&T)).

This invention, as also my inventions: "Computer system in which a human received signal-reaction, a human association, a human thought are substantiated and the working method of this computer system of artificial intelligence of a cyborg or an android", patent application (DE 10 2005 050 579.1, US 11/355,287, IS 174910), and "Working method for treatment of abstract objects (the thought-substances) of the computer system of AI (Artificial Intelligence) of a cyborg or an android", patent application (DE 10 2005 054 901.2, US 11/368,422, IS 175533), are based on one of my scientific discoveries, and/or a theory of subjectivity, with the subject—"Human intelligence. Natural intelligence. The functionality of the human (natural) intelligence."

The three inventions make it possible either the conversion of a humanoid robot into an android or the conversion of a human being into a cyborg with the artificial component, or with the artificial part, —the artificial intelligence.

An enormously gigantic job potential, which includes thousands of highly qualified, highly motivated, high-quality jobs in the different branches, is hidden behind this invention. For example:

1. cyborg (android)—hardware development;
2. cyborg (android)—software development;
3. cyborg (android)—production;
4. human cyborg (android)—pedagogy;
5. human cyborg (android)—education;
6. human (cyborg (android))—medicine;
7. human (cyborg (android))—fight against crime;
8. human (cyborg (android))—counterterrorism . . .

The way of posing a problem of this invention is:
1. to realize a pointer-oriented object acquisition method, with which the computer system of AI of a cyborg or an android administers the input/output information, i.e. the treated information, in a natural language efficiently;
2. to realize a pointer-oriented object acquisition method, with which the computer system of AI of a cyborg or an android classifies by itself the input/output information, i.e. the treated information, in a natural language as well;
3. to realize a pointer-oriented object acquisition method, with which the computer system of AI of a cyborg or an android gets access to the data elements of a class of the information in a natural language;
4. to realize a pointer-oriented object acquisition method, with which the computer system of AI of a cyborg or an android administers the input/output information, i.e. the treated information, in another natural language efficiently;
5. to substantiate an association in the computer system of AI of a cyborg or an android physically;
6. to substantiate a thought in the computer system of AI of a cyborg or an android physically.

The innovative solution accomplished by the present invention is that a natural language which the computer system uses with its pointer-oriented object acquisition working method is interpreted by the computer system in an object-oriented way of the thinking paradigm of the class-based model of OOP, or rather of the programming language C++.

In RAM (on the heap (the freely available memory storage area by dynamic memory allocation)) of the computer system of AI of a cyborg or an android, a pointer is created subjectively, in the sense of depending on the subject (on the computer system of AI of a cyborg or an android) at runtime. The addresses of the inputs of the reactions of the sensor groups which represent the sense organs (i.e. for example the group of the sense of sight, the group of the sense of hearing, the group of the sense of smell, the group of the sense of taste, the group of the sense of touch and thereto n groups from the n-Sense sensor groups else) are stored in this pointer. In this way, a subjective object of the computer system is instantiated. The subjective object is simultaneously acquired. However, the subjective object of the computer system of AI of a cyborg or an android is never considered relatively to time. The first pointer, i.e. the subjective object is temporary.

In its working method, in a natural language, the subjective object, i.e. the pointer which is identified as the subjective object and which refers to the reactions of the sensor groups which represent the sense organs, is associatively completed, in the sense of the associations of the subject (of the computer system of AI of a cyborg or an android), and is supplemented with consideration of relativity to time, in the sense of the real-time, which, however, can be implemented with the time-frame, for example as six weekdays and one holiday. This pointer is stored in another, the second pointer. In this way, an associative object of the computer system is instantiated. With the associative object, an association is physically substantiated in the computer system of AI of a cyborg or an android, in the sense of building a substance of the association. When the associative object has been instantiated, the subjective object will be deleted. Thus, the memory will be released.

Further in its working method, in RAM of the computer system of AI of a cyborg or an android, one, the third, pointer is created at runtime, in a natural language abstractly, in the sense of the abstract information in a natural language relating to the associative information which is stored in an associative object of the computer system of AI of a cyborg or an android. This pointer refers to the vocabulary of the computer system of AI of a cyborg or an android, or rather the RAM addresses of the words of the vocabulary of the computer system of AI of a cyborg or an android are stored under the object variables of this pointer. Consequently, the addresses of the words which build the associative information are stored under the object variables of this pointer. Furthermore, the object variables which contain some abstract information in itself belong also to the vocabulary (physically). The RAM addresses of the words of the vocabulary of the computer system of AI of a cyborg or an android are stored in its names as well. In this way, an abstract object of the computer system is instantiated and initialized, i.e. its object variables are instantiated and initialized. When the abstract object has been initialized, it will contain the abstract information of the entire associative object, i.e. from the entire subjective object. With the abstract object, a thought is physically substantiated in the computer system of AI of a cyborg or an android, in the sense of building a substance of the thought.

The third pointer does not refer to the associative object of computer system. It is the task of the cyborg-interpreter both of these pointers, the third and the second, to reference and to synchronize. The cyborg-interpreter is working in a natural language, for example German or English. Therefore, the reference of the abstract object, i.e. of the third pointer, get no access to the associative object, i.e. to the second pointer, i.e. even with help of the cyborg-interpreter.

The abstract objects are classified in a natural language in an object-oriented way of the thinking paradigm of the class-based model of OOP. (The classes of the computer system of AI of a cyborg or an android are classified by the computer system of AI of a cyborg or an android itself in a natural language in this manner as well.)

The element variables of a class, i.e. data elements, are implemented with the objects of the classes which define an interrogative in the natural language in which the computer system of AI of a cyborg or an android is working at this timeframe. With the interrogative of the question that is posed to a part of speech, i.e. to a part of a sentence.

The element functions of a class which manipulate with the element variables are actions, i.e. the verbs of the natural language in which the computer system of AI of a cyborg or an android is working at this timeframe. These element functions are stored, as a matter of course, under the element variable that represents an object of the class "Do".

The auxiliaries, the modal verbs, the prepositions, the conjunctions and so on are to treat as constants. They are stored in the natural language in which the computer system of AI of a cyborg or an android is working at this timeframe under in each case an element variable which is defined with help of an object of the class in which the auxiliary, the modal verb, the preposition, the conjunction and so on, itself, is classified.

If the different parts of a sentence, for example the object, the subject, the predicate, the attributes, the adverbial modifiers, the local modifier, the temporal modifier consist of several words, the parts of a sentence are initialized by the computer system of AI of a cyborg or an android in interpreting with the other variables defined previously and provided with a value. If these parts of a sentence are also stored under the abstract object, they should be deleted, i.e. should be forgotten, at the fastest.

The element variables of a class, i.e. the data elements, the element functions of a class which manipulate with the element variables, the constants, i.e. the element variables under which an element variable value, a function value, a constant value are stored, substantiate the thought as an abstract object analytically, keep in mind please, after working of the cyborg-interpreter.

The composite, compound or complex, sentences are decomposed by the computer system of AI of a cyborg or an android in interpreting the abstract object in each case on the simple sentences at the same real timestamp.

In order to perform the relativity to time of the abstract object, the state of affairs of the abstract object, the personality to the abstract object and so on, the abstract object is always stored with a modal verb, an auxiliary verb and so on.

With the aid of the third pointer, i.e. the abstract object, the computer system of AI of a cyborg or an android can get access to, as well as manipulate with the element variables, i.e. with the data elements of a class.

For working method in the other natural language, the computer system of AI of a cyborg or an android uses the references, i.e. the alias-names of the abstract object, in the other natural languages.

The telepathy is implemented with transferring all three objects, i.e. the subjective object, the corresponding associative object and the corresponding abstract object, of the computer system of AI of a cyborg or an android to another remote computer system of AI of a cyborg or an android simultaneously. All three objects of the computer system of AI of a cyborg or an android are transferred to another remote computer system of AI of a cyborg or an android with n-Sense, for example WLAN, in the sense of passing objects to a method with the mechanism "path-by-value". Both the current computer system of AI of a cyborg or an android and the remote computer system of AI of a cyborg or an android are working in real time. Therefore, the real timestamps of objects treatments for both of these systems are different.

Other details, features and advantages result from the execution examples shown in the drawings, and from the independent und dependent claims. The execution examples follow the description.

IN THE DRAWINGS

FIG. 2 is an illustration of access of the computer system of AI of a cyborg or an android to the data elements of a class in a natural language.

FIG. 3 is an illustration of access of the computer system of AI of a cyborg or an android to the data elements of a class in a natural language on another higher abstract level.

Figure 1B:
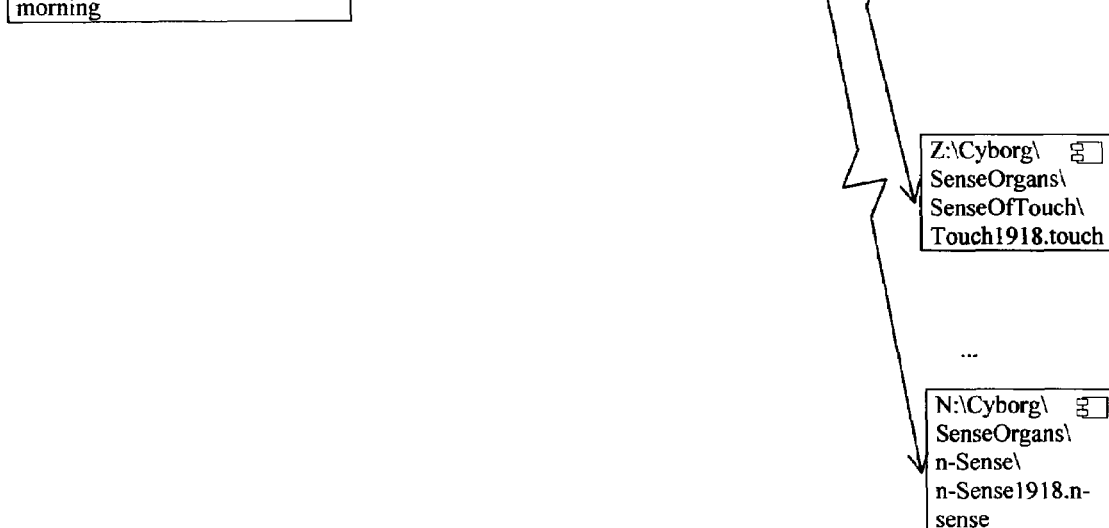
FIG. 1 illustrates the pointer-oriented object acquisition method for abstract treatment of information of the computer system of AI of a cyborg or an android based on a natural language.
Figure 1C:
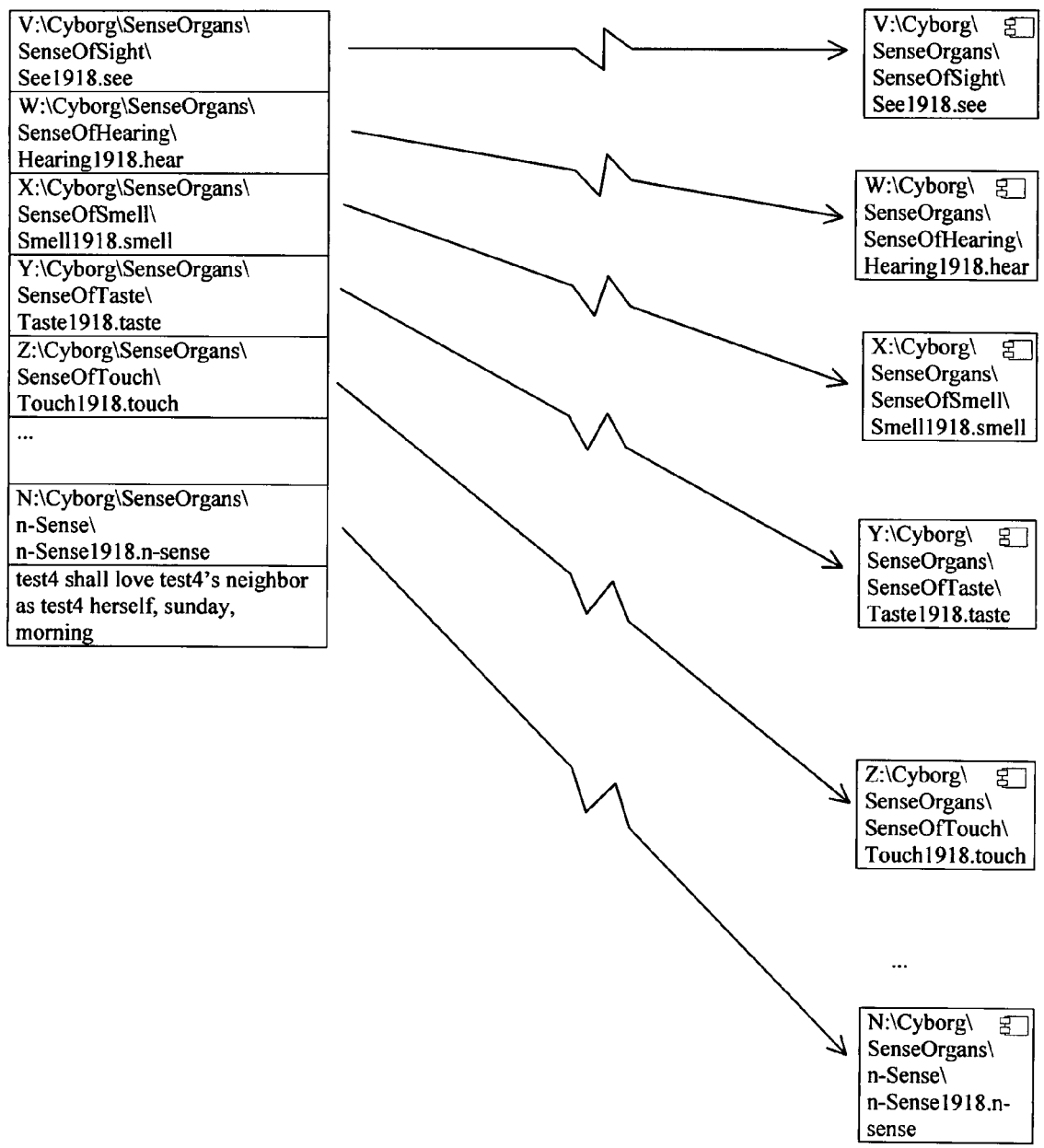
Figure 1D:
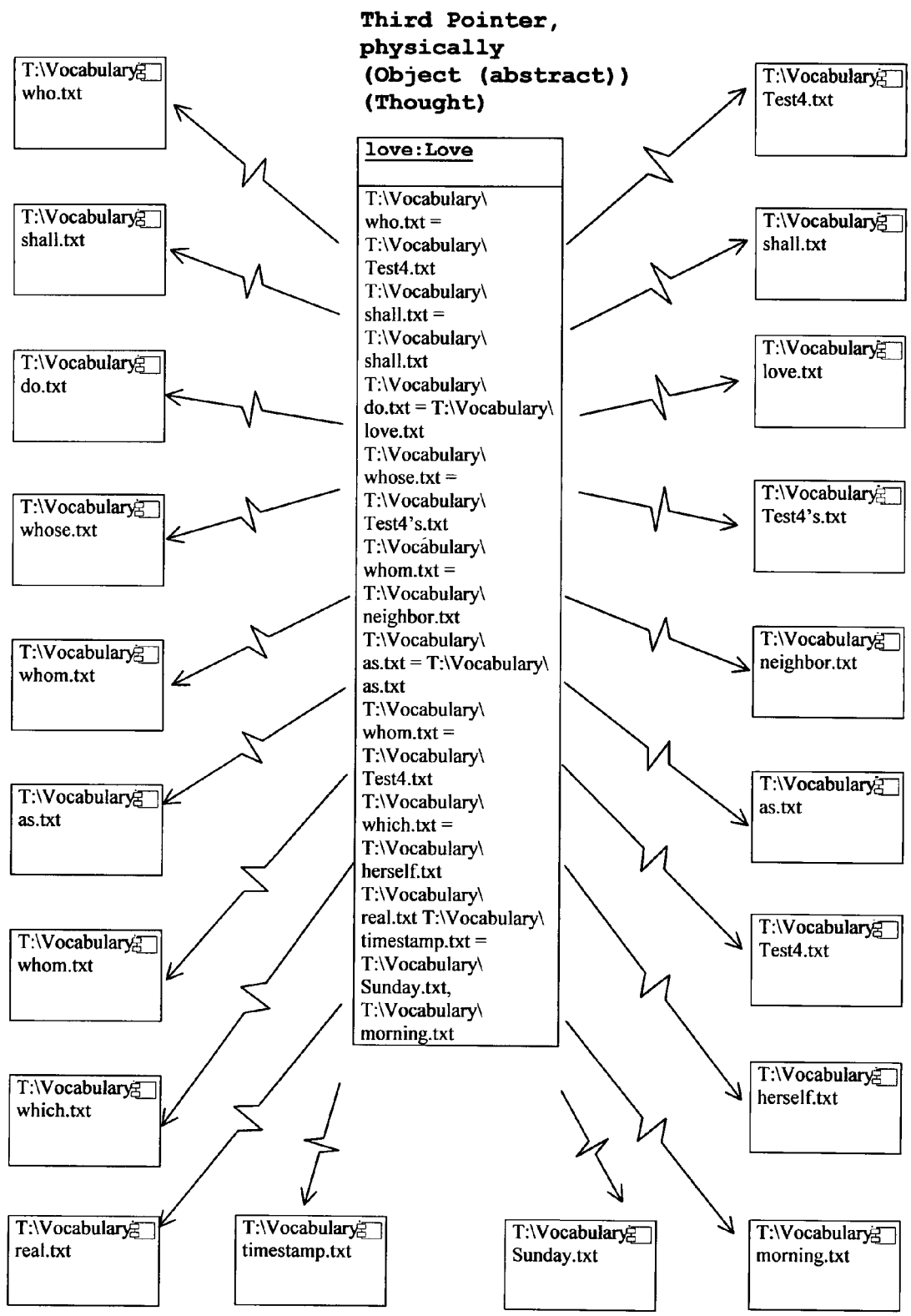

FIG. 1 illustrates the pointer-oriented object acquisition method for abstract treatment of information of the computer system of AI of a cyborg or an android based on a natural language. In RAM (on the heap (the freely available memory storage area by dynamic memory allocation)) of the computer system of AI of a cyborg or an android, a pointer is created subjectively, in the sense of depending on the subject (on the computer system of AI of a cyborg or an android) at runtime. The addresses of the inputs of the reactions of the sensor groups that represent the sense organs (i.e. for example the group of the sense of sight, the group of the sense of hearing, the group of the sense of smell, the group of the sense of taste, the group of the sense of touch and thereto n groups from the n-Sense sensor groups else) are stored in this pointer. In each individual case (at runtime) for example, the input of the sensors of the sensors group of the sense of sight is stored under the file V:\Cyborg\SenseOrgans\SenseOfSight\See1918.see on the V:\disk drive;

the input of the sensors of the sensors group of the sense of hearing is stored under the file W:\Cyborg\SenseOrgans\SenseOfHearing\Hearing1918.hear on the W:\disk drive;

the input of the sensors of the sensors group of the sense of smell is stored under the file X:\Cyborg\SenseOrgans\SenseOfSmell\Smell1918.smell on the X:\disk drive;

the input of the sensors of the sensors group of the sense of taste is stored under the file Y:\Cyborg\SenseOrgans\SenseOfTaste\Taste1918.taste on the Y:\disk drive;

the input of the sensors of the sensors group of the sense of touch is stored under the file Z:\Cyborg\SenseOrgans\SenseOfTouch\Touch1918.touch on the Z:\disk drive;

(thereto n inputs of the sensors of the n-Sense sensors groups else, for example) the input of the sensors of the sensors group of the n-sense is stored under the file N:\Cyborg\SenseOrgans\SenseOfn-Sense\n-Sense1918.n-sense on the N:\disk drive.

Then, the n paths are stored as n addresses under a pointer simultaneously.

$(S_1, S_2, S_3, S_4, S_5, \ldots, S_n$ (for example: variables; columns names in a table; etc.) signify n senses which are implemented at the concrete cyborg or an android)

$S_1$=V:\Cyborg\SenseOrgans\SenseOfSight\See1918.see $S_2$=W:\Cyborg\SenseOrgans\SenseOfHearing\Hearing 1918.hear $S_3$=X:\Cyborg\SenseOrgans\SenseOfSmell\Smell1918.smell $S_4$=Y:\Cyborg\SenseOrgans\SenseOfTaste\Taste1918.taste $S_5$=Z:\Cyborg\SenseOrgans\SenseOfTouch\Touch1918.touch

. . .

$S_n$=N:\Cyborg\SenseOrgans\SenseOfn-Sense\n-Sense1918.n-sense

In this way, a subjective object of the computer system is instantiated. The subjective object is simultaneously acquired. However, the subjective object of the computer system of AI of a cyborg or an android is never considered relatively to time.

The first Pointer, i.e. the subjective object, refers to the above-mentioned files.

Physically, in RAM (on the heap (the freely available memory storage area by dynamic memory allocation)) of the computer system of AI of a cyborg or an android, a pointer is instantiated subjectively, in the sense of depending on the subject (on the computer system of AI of a cyborg or an android) at runtime. This pointer is implemented as an object of the subjective, primitive, system-specifically previously defined class. (That means, the variables: $S_1$, $S_2$, $S_3$, $S_4$, $S_5$ . . . , $S_n$ are not used for the first pointer.) This pointer is initialized with the addresses of the inputs of the reactions of the sensors groups that represent the sense organs. (The disk drive paths were given for the presentation purposes only. The addressing can also be realized by the computer system of AI of a cyborg or an android in another manner). The first pointer, i.e. the subjective object, is temporary.

In its working method, in a natural language, the subjective object, i.e. the pointer that is identified as the subjective object and that refers to the reactions of the sensor groups that represent the sense organs, is associatively completed, in the sense of the associations of the subject (of the computer system of AI of a cyborg or an android), and is supplemented with consideration of relativity to time, in the sense of the real-time (no model-time), which, however, can be implemented with the timeframe, for example as six weekdays and one holiday. This pointer is stored in another one, in the second pointer. In this manner, an associative object of the computer system is instantiated. In each individual case, the paths that are stored in the first pointer:

$S_1$=V:\Cyborg\SenseOrgans\SenseOfSight\See1918.see;
$S_2$=W:\Cyborg\SenseOrgans\SenseOfHearing\Hearing 1918.hear;
$S_3$=X:\Cyborg\SenseOrgans\SenseOfSmell\Smell1918. smell;
$S_4$=Y:\Cyborg\SenseOrgans\SenseOfTaste\Taste1918. taste;
$S_5$=Z:\Cyborg\SenseOrgans\SenseOfTouch\Touch1918. touch;
. . .
$S_n$=N:\Cyborg\SenseOrgans\SenseOfn-Sense\n-Sense1918.n-sense, are stored in the second pointer in the same manner. The contents of the files are supplemented associatively. For example the information: "You shall love your neighbor as yourself" is supplemented as "Test4 shall love Test4's neighbor as test4 itself (herself)". The real-time of instantiating the associative object, "Sunday, morning", is acquired with. There will be the associative information then together: "Test4 shall love Test4's neighbor as test4 itself (herself, Sunday, morning".

Physically however, in RAM (on the heap (the freely available memory storage area by dynamic memory allocation)) of the computer system of AI of a cyborg or an android, a further pointer will be instantiated at runtime. This second pointer is also implemented as an object of the subjective, primitive, system-specifically previously defined class. (That means, the variables: $S_1, S_2, S_3, S_4, S_5, \ldots, S_n$ will be not used for the second pointer.) This pointer is initialized with the addresses of the inputs of the reactions of the sensors groups which represent the sense organs. (The disk drive paths were given for the presentation purposes only. The addressing can also be realized by the computer system of AI of a cyborg or an android in another manner.) This pointer must be able completed associatively, in the sense of the associations of the subject (of the computer system of AI of a cyborg or an android), and relevantly to time as well. The associative information will be supplemented with some abstract information with the cyborg-interpreter. For example, the information: "Test4 shall love Test4's neighbor as test4 itself (herself), Sunday, morning".

(Unfortunately, Case Sensitive (using of uppercase and lowercase letters) is not taken into consideration at the associative object yet.)

The supplemented information is to be viewed only like a signal, a label or a name.

(It can best be represented on a quite primitive example. While a dog is being trained the command "place", the brain of the dog is storing the subjective pieces of information of its place with the associative signal "place".)

With the associative object, i.e. with the second pointer, an association is physically substantiated in the computer system of AI of a cyborg or an android, in the sense of building a substance of the association. After the associative object has been instantiated, the subjective object will be deleted. Thus, the memory will be released. The memory that has been referred with the first pointer will be administered with the second pointer from this point in time.

Further in its working method, in RAM of the computer system of AI of a cyborg or an android, one, the third, pointer is created at runtime, in a natural language abstractly, in the sense of the abstract information in a natural language relating to the associative information that is stored in an associative object of the computer system of AI of a cyborg or an android. This pointer refers to the vocabulary of the computer system of AI of a cyborg or an android, i.e. the RAM addresses of the words of the vocabulary of the computer system of AI of a cyborg or an android are stored under the object variables of this pointer. Consequently, the addresses of the words that build the associative information are stored under the object variables of this pointer. Furthermore, the object variables that contain some abstract information in itself belong also to the vocabulary (physically). The RAM addresses of the words of the vocabulary of the computer system of AI of a cyborg or an android are stored in the names of the object variables as well:

T:\Vocabulary\who.txt; T:\Vocabulary\Test4.txt;
T:\Vocabulary\shall.txt; T:\Vocabulary\shall.txt;
T:\Vocabulary\do.txt; T:\Vocabulary\love.txt;
T:\Vocabulary\whose.txt; T:\Vocabulary\test4's.txt;
T:\Vocabulary\whom.txt; T:\Vocabulary\neighbor.txt;
T:\Vocabulary\as.txt; T:\Vocabulary\as.txt;
T:\Vocabulary\whom.txt; T:\Vocabulary\Test4.txt;
T:\Vocabulary\which.txt; T:\Vocabulary\itself.txt (herself-.txt);
T:\Vocabulary\real.txt T:\Vocabulary\timestamp.txt; T:\Vocabulary\Sunday.txt, T:\Vocabulary\morning.txt.

The word order of the part of a sentence, i.e. the sentence position, of the associative object, i.e. of the supplemented information of the associative object, is stored with the abstract object as well.

Physically however, in RAM (on the heap (the freely available memory storage area by dynamic memory allocation)) of the computer system of AI of a cyborg or an android, a pointer, the third one, will be instantiated at runtime. This third pointer is implemented as an object of the true, system-specifically object-oriented class. It means, the addresses of the values of the data elements are stored in the object variables. (The disk drive paths were given for the presentation purposes only. The addressing can also be realized by the computer system of AI of a cyborg or an android in another manner.)

In this way, an abstract object of the computer system is instantiated and initialized, i.e. its object variables are instantiated and initialized. When (only when, keep in mind please) the abstract object has been initialized, it will contain the abstract information of the entire associative object, i.e. from the entire subjective object.

With the abstract object, i.e. with the third pointer, a thought is physically substantiated in the computer system of AI of a cyborg or an android, in the sense of building a substance of the thought.

The third pointer does not refer to the associative object of computer system. It is the task of the cyborg-interpreter both of these pointers, the third and the second, to reference and to synchronize. The cyborg-interpreter is working in a natural language, for example German or English. Therefore, the reference of the abstract object, i.e. of the third pointer, get no access to the associative object, i.e. to the second pointer, i.e. even with help of the cyborg-interpreter.

The abstract objects are classified in a natural language in an object-oriented way of the thinking paradigm of the class-based model of OOP. (The classes of the computer system of AI of a cyborg or an android are classified by the computer system of AI of a cyborg or an android itself in a natural language in this way as well.)

With the aid of the third pointer, i.e. the abstract object, the computer system of AI of a cyborg or an android can get access to, as well as manipulate with the element variables, i.e. with the data elements of a class. The data elements, as said, are implemented in a natural language, i.e. are instantiated and initialized. These abstract data elements of a class which are instantiated and initialized with each abstract object will be described still further.

The element variables of a class, i.e. the data elements, the element functions of a class that manipulate with the element variables, the constants, i.e. the element variables under which an element variable value, a function value, a constant value are stored, substantiate the thought as an abstract object analytically, keep in mind please, after working of the cyborg-interpreter.

For working method in another natural language, the computer system of AI of a cyborg or an android uses the references, i.e. the alias-names of the abstract object, in the other natural languages.

"Test4 soll Test4s Naechsten lieben wie Test4 selbst" is a reference, an alias-name, in German to the abstract object of class "Love" in English: "Test4 shall love Test4's neighbor as Test4 herself".

The hardware deployment diagram of the computer system of AI of a cyborg or an android is illustrated in the middle of the FIG. 1A. On the hardware devices node 1 of the computer system of AI of a cyborg or an android are installed a hardware devices node 2 of the associative subjectivity 4 and a hardware devices node 3 of the abstract subjectivity 5. Hardware devices nodes are realized for the test and demo purposes as different computers. The periphery devices as well as the microcontrollers or another chips will be used for production.

FIG. 2 is an illustration of access of the computer system of AI of a cyborg or an android to the data elements of a class in a natural language. Element variables, element functions and constants are defined in the natural language for it.

Figure 4:
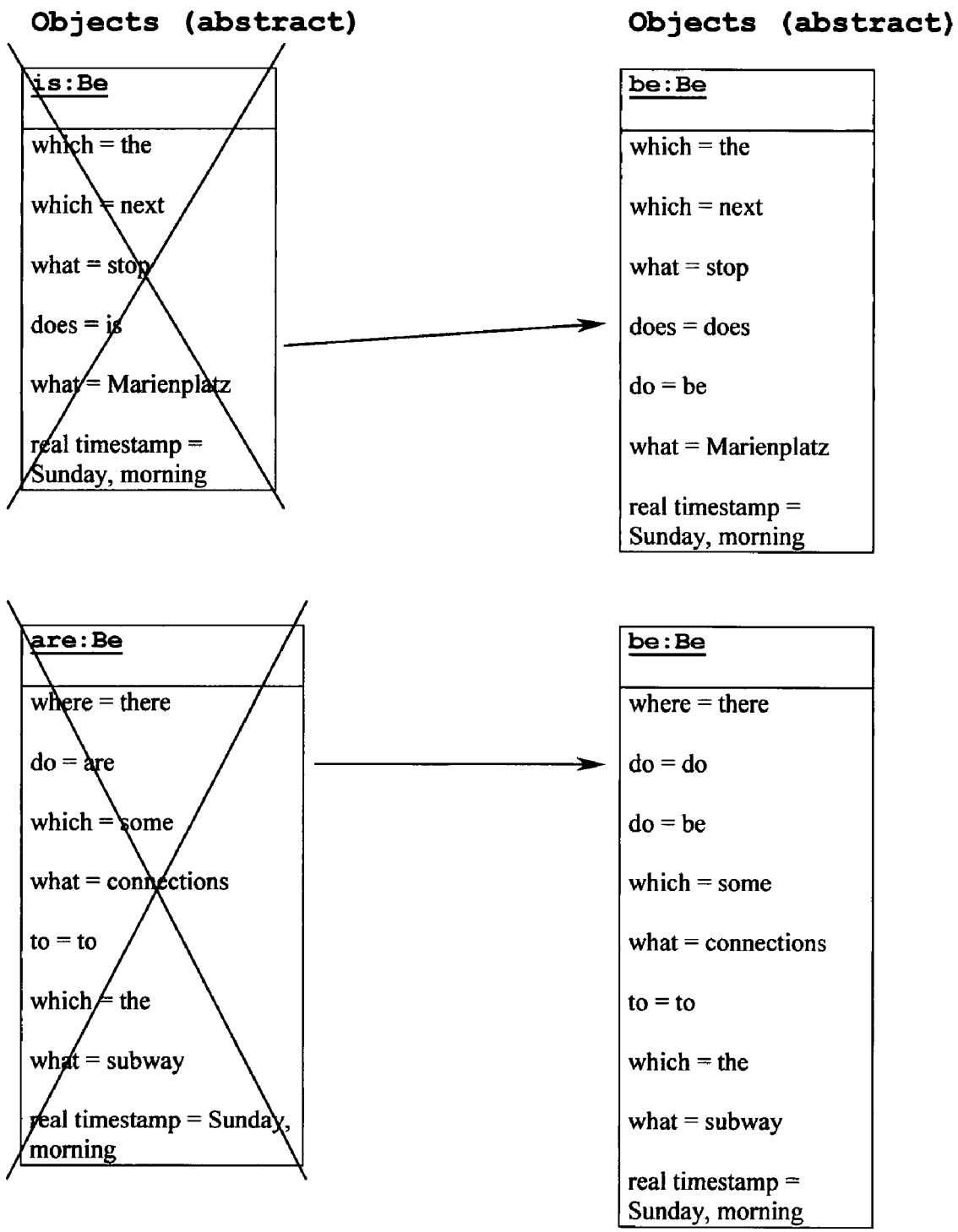
FIG. 4 shows a subjective, in the sense of depending on the subject (on the computer system of AI of a cyborg or an android), representation (of the computer system of AI of a cyborg or an android in a natural language) of the relativity to time of the abstract object; of the state of affairs, in the sense of ready or not ready, of the abstract object; of the personality to the abstract object.

(At the FIG. 2-4, the object means an abstract object of the computer system of AI of a cyborg or an android, i.e. the third pointer.)

The element variables of a class, i.e. data elements, are implemented with the objects of the classes that define an interrogative in the natural language in which the computer system of AI of a cyborg or an android is working at this timeframe. With the interrogative of the question that is posed to a part of speech, i.e. to a part of a sentence.

The computer system of AI of a cyborg or an android is interpreting an abstract object of class "Love": "Test4 shall love Test4's neighbor as Test4 herself". (Test4 is a person.)

The computer system of AI of a cyborg or an android has the following abstract information at its disposal:

The class "Whom" is derived from the class "Interrogative". The class "Whom" is an interrogative to an object that was represented as a noun that indicates a person (an animated noun). (The object was defined in the sense of a part of a sentence). (Please keep in mind that the strings "Whom" or "whom" are defined with help of the objects of the classes "Derive", "Be", "Represent", "Indicate").

As conclusion, the value "neighbor" is stored under the variable "whom", an object of the class "Whom", in the abstract object of the class "Love": "Test4 shall love Test4's neighbor as Test4 herself".

The composite, compound or complex, sentences are decomposed by the computer system of AI of a cyborg or an android while interpreting the abstract object in each case on the simple sentences at the same real timestamp, e.g.:

The composite sentence: "The class "Whom" is an interrogative to an object that was represented as a noun that indicates a person (an animated noun)", was decomposed by the computer system of AI of a cyborg or an android after interpreting the abstract object on four simple sentences with the same timestamp:

The class "Whom" is an interrogative to an object.
Object was represented as a noun.
Noun indicates a person.
Noun is an animated noun.

As another abstract object, an object of the class "Steal" will be interpreting: "Test4 shall not steal". (Test4 is a person.)

The computer system of AI of a cyborg or an android has the following abstract information at its disposal:

The class "Who" is derived from the class "Interrogative". The class "Who" is an interrogative to a subject that was represented as a noun that indicates a person (an animated noun). (The subject was defined in the sense of a part of a sentence). (Please keep in mind that the strings "Who" or "who" are defined with help of the objects of the classes "Derive", "Be", "Represent", "Indicate").

As conclusion, the value "Test4" is stored under the variable "who", an object of the class "Who", in the abstract object of the class "Steal": "Test4 shall not steal".

The composite sentence: "The class "Who" is an interrogative to a subject that was represented as a noun that indicates a person (an animated noun)", was decomposed by the computer system of AI of a cyborg or an android after interpreting the abstract object on four simple sentences with the same timestamp:

The class "Who" is an interrogative to a subject.
Subject was represented as a noun.
Noun indicates a person.
Noun is an animated noun.

The element functions of a class that manipulate with the element variables are implemented with an object of the class that classifies words that belong to the word stem of a verb of the natural language (i.e. the class that classifies in each case only a word of the word stem) in which the computer system of AI of a cyborg or an android is working at this timeframe. These element functions are stored, as a matter of course, under the element variable that is represented with an object of the class that classifies words that belong to the word stem of the verb "do". (Please keep in mind that the strings, "element" "functions", "object" "of" "the" "word" "stem" "class" or "do" are defined with help of the objects of the classes "Manipulate", "Implement", "Classify", "Belong", "Work" and so on).

That is that the value "love", an object of the class that classifies words that belongs to the word stem of the verb "love", is stored under the variable "do", an object of the class that classifies words that belong to the word stem of the verb "do", in the abstract object of the class "Love": "Test4 shall love Test4's neighbor as Test4 herself".

The auxiliaries, the modal verbs, the prepositions, the conjunctions and so on are to treat as constants. They are stored in the natural language in which the computer system of AI of a cyborg or an android is working at this timeframe under in each case an element variable that is defined with help of an object of the class in which the auxiliary, the modal verb, the preposition, the conjunction and so on, itself, are classified.

The computer system of AI of a cyborg or an android is interpreting an abstract object of class "Love": "Test4 shall love Test4's neighbor as Test4 herself" further.

The computer system of AI of a cyborg or an android has the following abstract information at its disposal:

The class "Shall" is derived from the class "Modal Verb". (An object of the class "Be".)

As conclusion, the value "shall" is stored under the variable "shall", an object of the class "Shall", in the abstract object of the class "Love": "Test4 shall love Test4's neighbor as Test4 herself".

The objects of the classes in which an interrogative is defined in the natural language, e.g. "Which" or "Who"; the object of the class that classifies words that belong to the word stem of the verb "Do", e.g. "do"; the objects of the classes in which the auxiliary, the modal verb, the preposition, the conjunction and so on are defined, e.g. "Shall", substantiate the thought as an abstract object analytically, in the sense of working of the cyborg-interpreter.

With the aid of the third pointer, i.e. the abstract object, the computer system of AI of a cyborg or an android can get access to the element variables, i.e. to the data elements of a class, as well as manipulate with the element variables, i.e. with the data elements of a class.

FIG. 3 is an illustration of access of the computer system of AI of a cyborg or an android to the data elements of a class in a natural language on another higher abstract level.

The diverse parts of a sentence, i.e. for example the object, the subject, the predicate, the attributes, the adverbial modifiers, the local modifier, the temporal modifier etc., can consist of several words as well. The parts of a sentence that consist of several words are initialized by the computer system of AI of a cyborg or an android in interpreting with the other variables defined previously and provided with a value.

If these parts of a sentence are also stored under the abstract object, they should be deleted, i.e. should be forgotten, at the fastest.

The computer system of AI of a cyborg or an android is interpreting an abstract object of class "Love": "Test4 shall love Test4's neighbor as Test4 herself" still further.

The computer system of AI of a cyborg or an android has the following abstract information at its disposal:

The class "Who" is derived from the class "Interrogative".

The value "Test4's" is stored in the abstract object of the class "Love": "Test4 shall love Test4's neighbor as Test4 herself" under the variable "whose" that is an object of the class "Who".

The value "neighbor" is stored in the abstract object of the class "Love": "Test4 shall love Test4's neighbor as Test4 herself" under the variable "whom" that is an object of the class "Who".

The value "Test4's neighbor" is stored under the variable "whom", an object of the class "Who", in the abstract object of the class "Love": "Test4 shall love Test4's neighbor as Test4 herself". The value of the variable "whom" that is an object of the class "Who" is initialized with chaining the values which are stored under the variables "whose" and "whom" that are the objects of the classes "Who".

On the other hand in German, the value "Test4s Naechsten" is stored under the variable "whom", an object of the class "Who" (in German—"wen" that is an object of the class "Wer"), in the abstract object of the class "Lieben": "Test4 soll Test4s Naechsten lieben wie Test4 selbst". The value of the variable "whom" is initialized with chaining the values that are stored under the variables "whose" and "which" that are the objects of the classes "Who" and "Which". (In German—"wessen" and "welchen" that are the objects of the classes "Wer" and "Welcher".)

Then, the computer system of AI of a cyborg or an android is interpreting an abstract object of class "Be": "Test4 was on the Marienplatz at 10 o'clock".

The computer system of AI of a cyborg or an android has the following abstract information at its disposal:

The class "When" is derived from the class "Interrogative".

The value "at" is stored in the abstract object of the class "Be": "Test4 was on the Marienplatz at 10 o'clock" under the constant "at" that is an object of the class "At".

The value "ten" is stored in the abstract object of the class "Be": "Test4 was on the Marienplatz at 10 o'clock" under the variable "how many" that is an object of the class "How many".

The value "o'clock" is stored in the abstract object of the class "Be": "Test4 was on the Marienplatz at 10 o'clock" under the variable "what" that is an object of the class "What".

As conclusion, the value "at 10 o'clock" is stored under the variable "when", an object of the class "When", in the abstract object of the class "Be": "Test4 was on the Marienplatz at 10 o'clock". The value of the variable "when" that is an object of the class "When" is initialized with chaining the values that are stored under the variables "at", "how many", and "what" that are the objects of the classes "At", "How many" and "What".

The objects of the classes in which an interrogative is defined in the natural language, e.g. "who" or "when"; the object of the class that classifies words that belong to the word stem of the verb "Do", e.g. "did"; the objects of the classes in which the auxiliary, the modal verb, the preposition, the conjunction and so on are defined, e.g. "on" or "at", substantiate the thought as an abstract object analytically, in the sense of working of the cyborg-interpreter.

FIG. 4 shows a subjective, in the sense of depending on the subject (on the computer system of AI of a cyborg or an android), representation (of the computer system of AI of a cyborg or an android in a natural language) of the relativity to time of the abstract object; of the state of affairs, in the sense of ready or not ready, of the abstract object; of the personality to the abstract object.

In order to perform the relativity to time of the abstract object of the computer system of AI of a cyborg or an android in a natural language, the state of affairs of the abstract object, in the sense of ready or not ready, the personality to the abstract object etc., the abstract object is always stored with a modal verb, an auxiliary verb and so on.

The computer system of AI of a cyborg or an android is located in Munich and is driving across the Marienplatz with the S-Bahn (urban rail) train of the MVV (Munich Transport and Tariff Association).

The computer system of AI of a cyborg or an android is hearing such info messages of the MVV in the S-Bahn train:

Next stop: Marienplatz.

Connections to the subway.

This abstract information is interpreted and understood by the computer system of AI of a cyborg or an android in the S-Bahn train like this:

The next stop is Marienplatz.

There are some connections to the subway.

That is that two abstract objects of the class "Be" are subjectively defined and are subjectively treated with the computer system of AI of the cyborg or the android.

This information (it means the abstract objects), however, is stored with the auxiliary respectively:

The next stop does be Marienplatz.

There do be some connections to the subway.

There follow 10 sheets of drawings.

The invention claimed is:

1. A pointer-oriented object acquisition method for tangible treatment of information of the computer system which is based on one natural language and in which a received signal-reaction of this computer system of Artificial Intelligence of a cyborg or an android, a corresponding association of this computer system of Artificial Intelligence of a cyborg or an android, a corresponding thought of this computer system of Artificial Intelligence of a cyborg or an android are substantiated, characterized in that the first pointer in which the RAM (Random Access Memory) addresses of the inputs of all n reactions of all n sensor groups that represent all sense organs (or rather at least five sensor groups, the group of the sense of sight, the group of the sense of hearing, the group of the sense of smell, the group of the sense of taste, the group of the sense of touch and thereto all n groups from all n-Sense organ sensor groups else) are stored is substantiated and treated subjectively by the pointer-oriented object acquisition method in RAM of the computer system of Artificial Intelligence of a cyborg or an android at run-time as a subjective object (as a received signal-reaction of this computer system of Artificial Intelligence of a cyborg or an android), in a way of the thinking paradigm of the programming language C++, as in instancing an object on the Heap (the freely available memory storage area by dynamic memory allocation).

2. The pointer-oriented object acquisition method according to claim 1, characterized in that a third pointer on the vocabulary of the computer system in which the RAM (Random Access Memory) address (of memory area in which each word of the vocabulary of the computer system of Artificial Intelligence of a cyborg or an android is mapped, or rather is stored) of each parsed word of the associative object, or rather of the association, is stored together with the RAM address of the word that contains the abstract information of the parsed word in the context to the entire associative object is substantiated and treated tangibly in the one natural language by the pointer-oriented object acquisition method at run-time as an abstract object (as a corresponding thought of this computer system of Artificial Intelligence of a cyborg or an android), in a way of the thinking paradigm of the programming language C++, as in instancing an object on the Heap (the freely available memory storage area by dynamic memory allocation).

3. The pointer-oriented object acquisition method according to claim 1, characterized in that the subjective object, or rather the first pointer that is termed as the subjective object, is simultaneously acquired, however it is not considered relative to time.

4. The pointer-oriented object acquisition method according to claim 1, characterized in that the subjective object, or rather the first pointer that is identified as the subjective object, after it has been completed associatively and relative to time will be stored by the pointer-oriented object acquisition method in the RAM (Random Access Memory) of the computer system of Artificial Intelligence of a cyborg or an android at run-time as a second pointer that will be identified as an associative object (as a corresponding association of this computer system of Artificial Intelligence of a cyborg or an android).

5. The pointer-oriented object acquisition method according to claim 2, characterized in that the element variables of a class of the abstract object, i.e. data elements, are instantiated with the objects of the classes in which the words that belong to an interrogative of the natural language in which the computer system of Artificial Intelligence of a cyborg or an android is working at this timeframe are classified, i.e. with the interrogative of the question that is posed to a part of speech, or rather to a part of a sentence.

6. The pointer-oriented object acquisition method according to claim 2, characterized in that the element functions of a class of the abstract object which manipulate with the element variables are initialized with the objects of the classes in which the words that belong to the word stem of a verb of the natural language in which the computer system of Artificial Intelligence of a cyborg or an android is working at this timeframe are classified and are instantiated under the element variable that is represented with an object of the class in which words that belong to the word stem of the verb "do" are classified.

7. The pointer-oriented object acquisition method according to claim 2, characterized in that the auxiliaries, the modal verbs, the prepositions, the conjunctions and so on, which are to treat as constants, are stored in the natural language in which the computer system of Artificial Intelligence of a cyborg or an android is working at this timeframe under in each case an element variable that is defined with help of an object of the class in which the auxiliary, the modal verb, the preposition, the conjunction and so on, itself, is classified.

8. The pointer-oriented object acquisition method according to claim 2, characterized in that the diverse parts of a sentence, for example the object, the subject, the predicate, the attributes, the adverbial modifiers, the local modifier, the temporal modifier etc., which consist of several words, are initialized by the computer system of Artificial Intelligence of a cyborg or an android in interpreting with the other variables defined previously and provided with a value.

9. The pointer-oriented object acquisition method according to claim 8, characterized in that the parts of a sentence which consist of several words and which are initialized by the computer system of Artificial Intelligence of a cyborg or an android in interpreting with the other variables defined previously and provided with a value are deleted, i.e. are forgotten, at the fastest.

10. The pointer-oriented object acquisition method according to claim 2, characterized in that the composite, compound or complex, sentences are decomposed by the computer system of Artificial Intelligence of a cyborg or an android in interpreting the abstract object in each case on the simple sentences at the same real timestamp.

11. The pointer-oriented object acquisition method according to claim 2, characterized in that in order to perform the relativity to time of the abstract object of the computer system of Artificial Intelligence of a cyborg or an android in the one natural language, the state of affairs of the abstract object, the personality to the abstract object etc. the abstract object is always stored with a modal verb, an auxiliary verb and so on.

12. A pointer-oriented object acquisition method for tangible treatment of information of the computer system which is based on one natural language and in which a received signal-reaction of this computer system of Artificial Intelligence of a cyborg or an android, a corresponding association of this computer system of Artificial Intelligence of a cyborg or an android, a corresponding thought of this computer system of Artificial Intelligence of a cyborg or an android are substantiated, characterized in that the telepathy is implemented with transferring all three objects, i.e. the received signal-reaction, the corresponding association and the corresponding thought, of the computer system of Artificial Intelligence of a cyborg or an android to another remote computer system of Artificial Intelligence of a cyborg or an android simultaneously.

13. The pointer-oriented object acquisition method according to claim 12, characterized in that the telepathy is implemented with transferring all three objects, i.e. the received signal-reaction, the corresponding association and the corresponding thought, of the computer system of Artificial Intelligence of a cyborg or an android to another remote computer system of Artificial Intelligence of a cyborg or an android with n-Sense, for example WLAN, in the sense of passing objects to a method with the mechanism "path-by-value".

14. The pointer-oriented object acquisition method according to claim 1, characterized in that the relativity to time during this pointer-oriented object acquisition method of the computer system of Artificial Intelligence of a cyborg or an android can be implemented as six weekdays and one holiday.

15. A pointer-oriented object acquisition method of the computer system which is based on one natural language and in which a received signal-reaction of this computer system of Artificial Intelligence of an android, a corresponding association of this computer system of Artificial Intelligence of an android, a corresponding thought of this computer system of Artificial Intelligence of an android are substantiated, characterized in that the first pointer in which the RAM (Random Access Memory) addresses of the inputs of all n reactions of all n sensor groups that represent all sense organs (or rather at least five sensor groups, the group of the sense of sight, the group of the sense of hearing, the group of the sense of smell, the group of the sense of taste, the group of the sense of touch and thereto all n groups from all n-Sense organ sensor groups else) are stored is substantiated and treated subjectively by the pointer-oriented object acquisition method in RAM of the computer system of Artificial Intelligence of an android at run-time as a subjective object (as a received signal-reaction of this computer system of Artificial Intelligence of an android), in a way of the thinking paradigm of the programming language C++, as in instancing an object on the Heap (the freely available memory storage area by dynamic memory allocation).

* * * * *